Jan. 17, 1967  W. F. MELLEN  3,298,445
TRACTOR WITH LIFTABLE REAR COULTER
AND MOLDBOARD PLOW COMBINATION
Filed Aug. 16, 1965  4 Sheets-Sheet 1
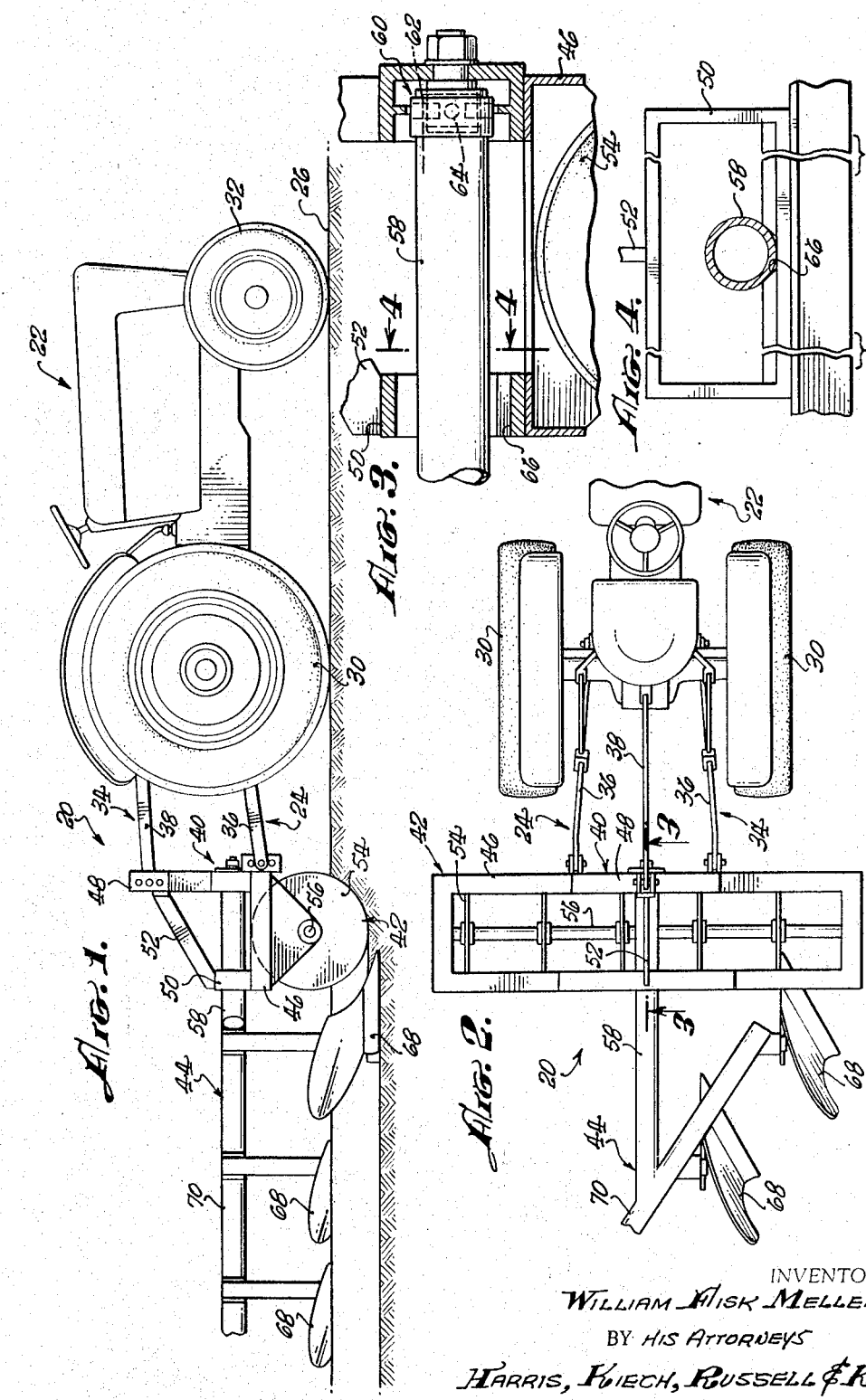
INVENTOR.
WILLIAM FISK MELLEN,
BY HIS ATTORNEYS
HARRIS, KIECH, RUSSELL & KERN.

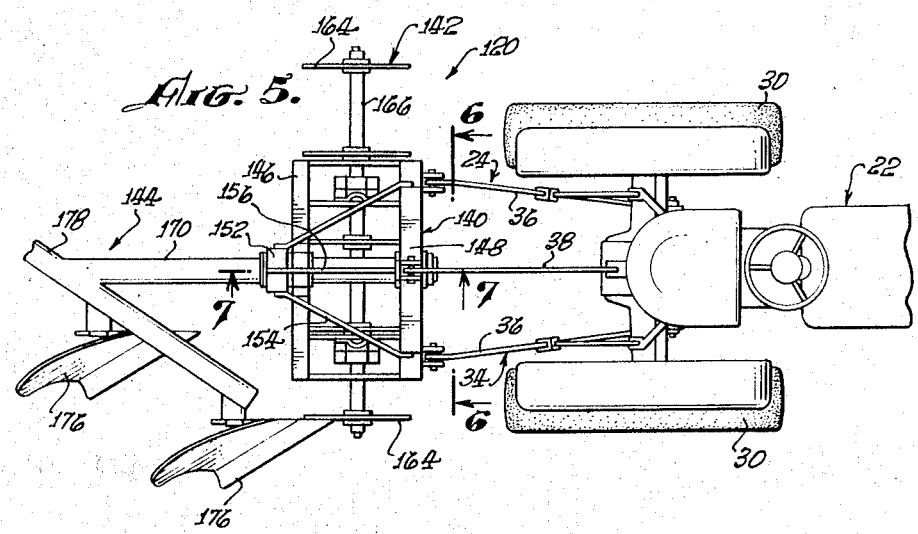
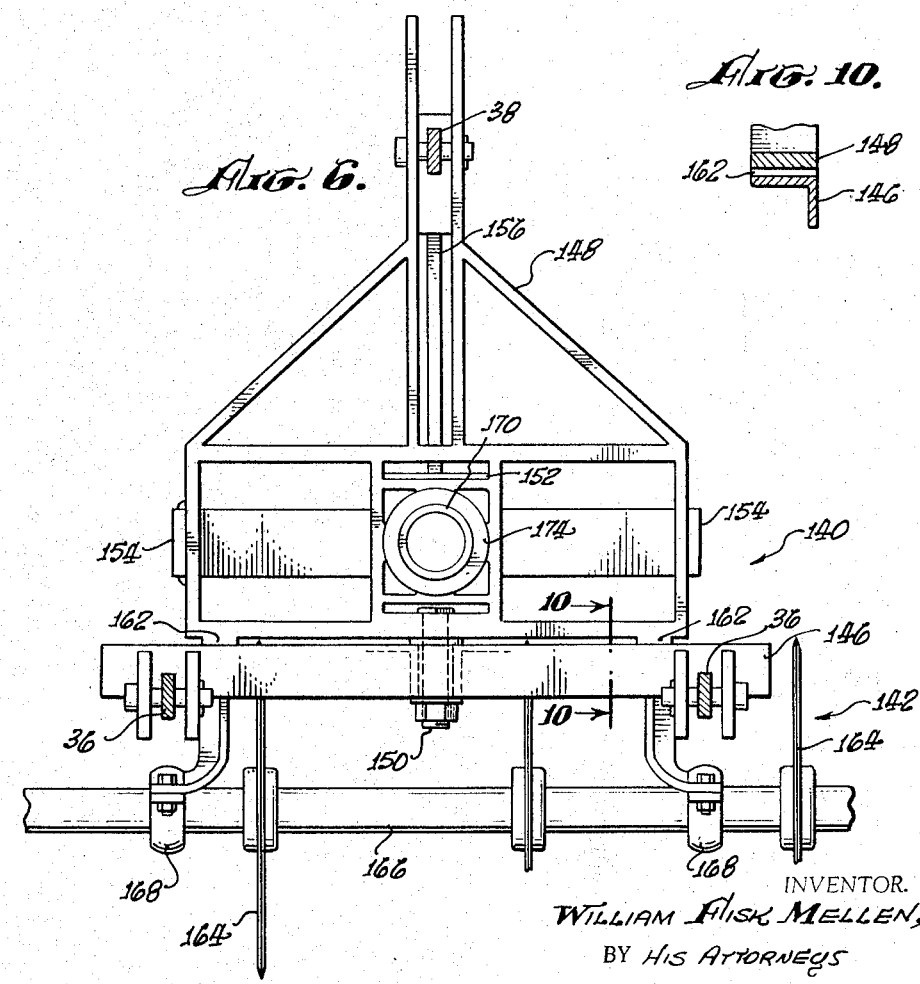

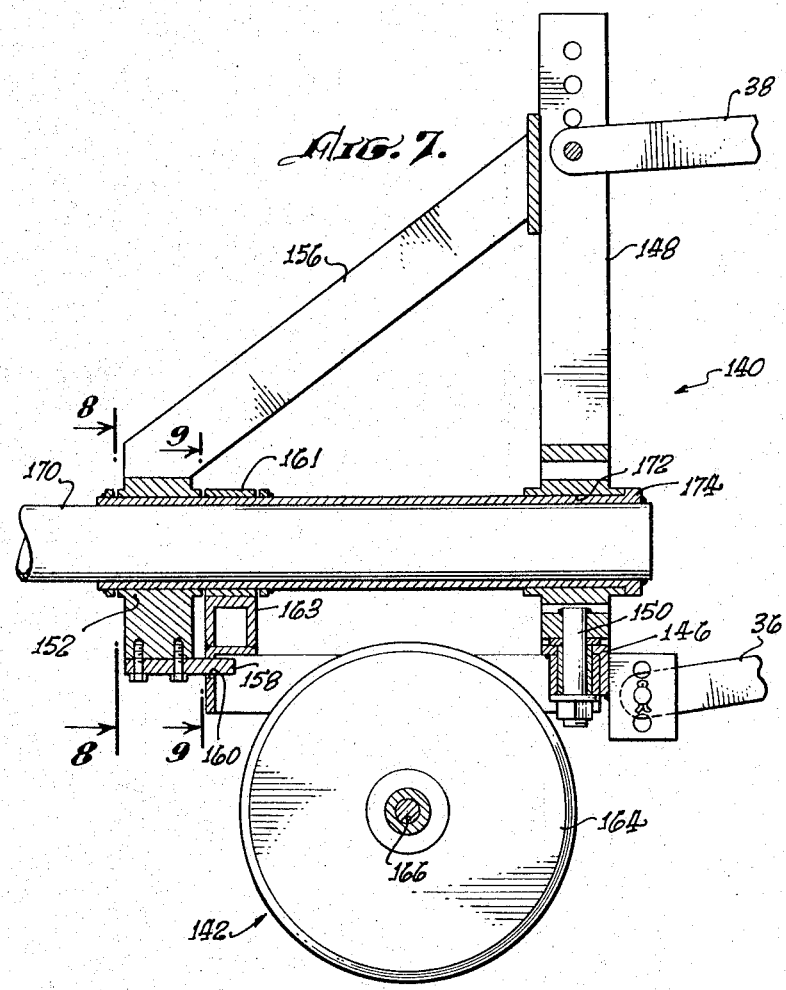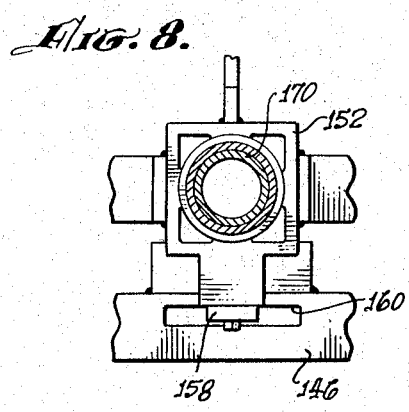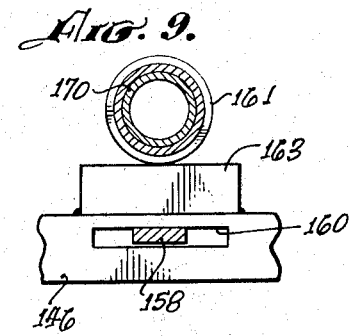

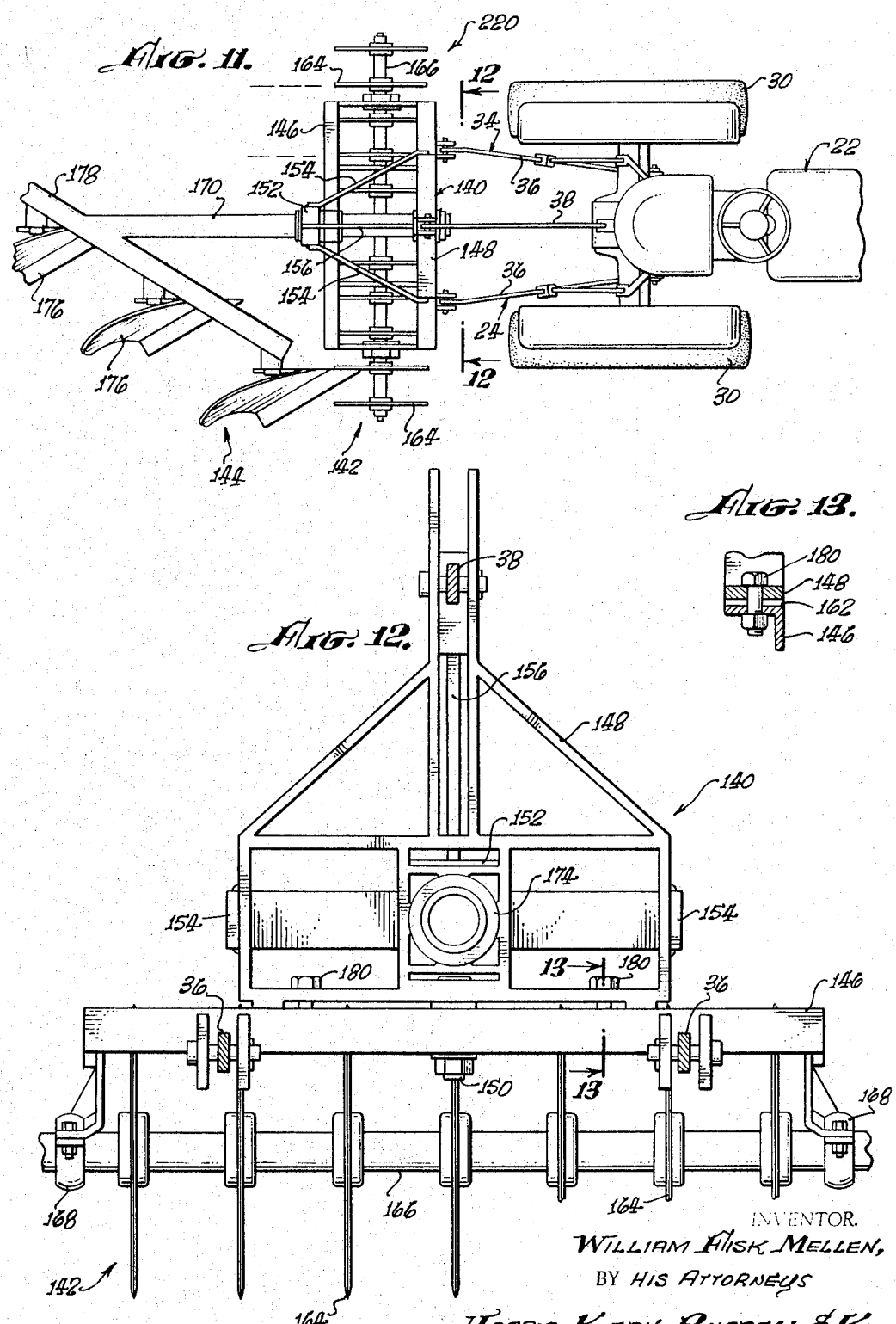

United States Patent Office 3,298,445
Patented Jan. 17, 1967

3,298,445
TRACTOR WITH LIFTABLE REAR COULTER AND MOLDBOARD PLOW COMBINATION
William Fisk Mellen, Anaheim, Calif.
(P.O. Box 2032, Fullerton, Calif. 92633)
Filed Aug. 16, 1965, Ser. No. 479,760
5 Claims. (Cl. 172—166)

This application is a continuation-in-part of my copending application Serial No. 350,739, filed March 10, 1964, and now abandoned.

The present invention relates in general to tractor-operated soil tillage implements or tools and, more particularly, to a soil tillage tool movable between a lowered, soil-tilling position and a raised, inoperative position clear of the ground by a lifting apparatus with which the tractor is equipped. For convenience, the invention will be considered herein in connection with a soil tillage tool adapted to be located behind the tractor and to be drawn through the ground by the lifting apparatus of the tractor when the tool is in its lowered, soil-tilling position.

The invention contemplates a soil tillage tool of such width and so located laterally of the tractor that the tractor runs on untilled ground adjacent previously tilled soil. In other words, the invention avoids running any part of the tractor in previously tilled ground, such as a furrow previously produced by a moldboard plow constituting part of the soil tillage tool. Running the tractor on untilled soil has various advantages, such as minimizing tractor wear, minimizing tractor-produced soil compaction, and the like.

A primary object of the invention is to provide a soil tillage tool for use in the foregoing manner which transmits no side draft to the tractor through the lifting apparatus thereof even if the tool includes soil-tilling means inherently capable of producing side draft, or includes soil-tilling means offset to one side of the longitudinal centerline of the tractor so as to tend to produce side draft, or both.

More particularly, a primary object of the invention is to provide a soil tillage tool which includes primary soil-tilling means capable of producing side draft, either inherently, or because of a lateral offset, or both, and which includes secondary soil-tilling, stabilizing means, free from side draft and located ahead of the primary soil-tilling means and connected to the lifting apparatus of the tractor, for preventing the transmission of side draft from the primary soil-tilling means to the tractor. In other words, a primary object is to provide such a secondary soil-tilling, stabilizing means which, through its engagement with the ground when the soil tillage tool is in its soil-tilling position, resists the application of side draft to the tractor through its lifting apparatus, and, in effect, laterally rigidifies, or provides a rigid lateral anchor for, the tractor and its lifting apparatus.

With this construction, the rear, primary soil-tilling means is caused to trail behind the secondary soil-tilling, stabilizing means without transmitting to the tractor any side draft tending to deflect the tractor to one side or the other of a straight path. Thus, the tractor runs in a straight line without the weaving or wandering which normally occurs as the operator of the tractor attempts to overcome side draft applied to the tractor, particularly where the side draft acting on the tractor is variable due to varying soil conditions. The end results are better soil tillage, less wear of the tractor, less fatigue for the operator, and the like, all of which are important features of the invention.

The invention is particularly applicable to a soil tillage tool of the foregoing nature wherein the primary soil-tilling means is a moldboard plow, and will be considered in such connection hereinafter as a matter of convenience. A moldboard plow is ordinarily inherently subject to side draft. Furthermore, when the tractor is operated on unplowed soil, i.e., when the tractor is operated without running the wheels on one side thereof in a previously-plowed furrow, it is normally necessary to offset the plow to one side of the longitudinal centerline of the tractor, i.e., to locate the majority of the plow bottoms to one side of the longitudinal centerline. Considering the reasons for this lateral offsetting requirement, the leading plow bottom must be located laterally outside of the corresponding rear wheel of the tractor to enable the tractor to run on solid ground a sufficient distance laterally from a previously-plowed furrow to prevent caving-in of the land side of such furrow. Except in the case of an unusually powerful tractor, the tractor can neither pull nor lift enough plow bottoms to permit a symmetrical arrangement under such conditions, i.e., an arrangement wherein equal whole or fractional numbers of plow bottoms are disposed on opposite sides of the longitudinal centerline of the tractor. Hence, lateral offsetting of the plow is necessary. Another reason for laterally offsetting the plow is that, in most instances, a symmetrical array of plow bottoms permitting tractor operation on unplowed ground would be so heavy that, even if the tractor had the power to lift it, the overhanging weight would lift the front end of the tractor off the ground. (It will be understood that the offset of the moldboard plow will normally be to the right, but will be alternately to the right and left in the case of a two-way or reversible plow.)

The secondary soil-tilling, stabilizing means of the invention prevents the transmission to the tractor of the side draft resulting from such a lateral moldboard-plow offset. As hereinbefore outlined, the stabilizing means accomplishes this by transmitting the moldboard-plow side draft to the soil, thereby providing a rigid lateral anchor for the tractor and its lifting apparatus which precludes the transmission of the moldboard-plow side draft to the tractor itself. The end result is that the tractor automatically runs in a straight line with no significant amount of side-draft-correcting steering being necessary.

Another and important object of the invention is to provide such a secondary soil-tilling, stabilizing means comprising coulter blades spaced apart transversely of the longitudinal centerline of the tractor ahead of the moldboard plow and positioned in soil-tilling engagement with the ground when the soil tillage tool is in its lowered, soil-tilling position. More particularly, the coulter blades are spaced apart along a transverse line substantially perpendicular to the longitudinal centerline of the tractor, and are arrayed symmetrically relative to such centerline. With this arrangement, and since coulter blades are inherently free from side draft, the coulter blades themselves have no tendency to transmit side draft to the tractor through its lifting apparatus.

Another important feature of the invention is that the side-draft-stabilizing coulter blades slice any trash on or near the surface of the ground into relatively small pieces which can readily be plowed under by the trailing moldboard plow. Furthermore, the coulter blades cut the soil into strips ahead of the moldboard plow to minimize the size of clods produced by the plow. Thus, the coulter blades, in addition to performing their side-draft-stabilizing function, also improve the results of the plowing operation in the additional respects mentioned.

Considering the invention in somewhat more detail, a general object is to provide a soil tilling tool which includes: a mounting frame; means for connecting the mounting frame to the lifting apparatus of the tractor for movement thereby between raised and lowered positions; side-draft-stabilizing coulter blades carried by the mounting frame and spaced apart transversely of the longitudinal centerline of the tractor and positioned in soil-tilling engagement with the ground when the mounting frame is in its lowered position; and a moldboard plow located behind and connected to the mounting frame and positioned in soil-tilling engagement with the ground when the mounting frame is in its lowered position and having the majority of its plow bottom offset to one side of the longitudinal centerline of the tractor. A related object is to provide a soil tillage tool wherein the mounting frame includes a lower, stabilizing frame carrying the side-draft-stabilizing coulter blades in transversely spaced relation along a lateral line substantially perpendicular to the longitudinal centerline of the tractor.

Other objects of the invention are to provide a soil tillage tool wherein the moldboard plow is either rigidly connected to the stabilizing frame, or is laterally pivotable or swingable relative thereto, about an upright axis, into a trailing position wherein the side draft applied to the stabilizing coulter blades is minimized. A further object is to utilize a greater number of stabilizing coulter blades in the case of a rigid connection between the moldboard plow and the stabilizing frame, as compared to the case of the pivotal connection permitting lateral swinging movement of the moldboard plow about an upright axis, the greater number of coulter blades in the case of the rigid connection being necessary to resist the greater side draft transmitted to the stabilizing frame under such conditions.

More specifically, objects of the invention are to utilize a number of coulter blades aproximately double the number of plow bottoms in the case of a rigid connection between the moldboard plow and the stabilizing frame, and to utilize a number of coulter blades approximately equal to the number of plow bottoms in the case of the pivotal connection between the moldboard plow and the stabilizing frame. Such relationships between the numbers of coulter blades and the numbers of plow bottoms are based on a coulter-blade diameter such that the coulter blades penetrate the soil to nearly the same depth as the plow bottoms.

The foregoing objects, advantages, features and results of the present invention, together with various other objects, advantages, features and results thereof which will be evident to those skilled in the soil-tilling art in the light of this disclosure, may be achieved with the exemplary embodiments of the invention described in detail hereinafter and illustrated in the accompanying drawings, in which:

FIG. 1 is a fragmentary side elevational view of one embodiment of the tractor-drawn soil tillage tool of the invention;

FIG. 2 is a fragmentary plan view of the apparatus of FIG. 1;

FIG. 3 is an enlarged, fragmentary sectional view taken as indicated by the arrowed line 3—3 of FIG. 2;

FIG. 4 is a sectional view taken as indicated by the arrowed line 4—4 of FIG. 3;

FIG. 5 is a fragmentary plan view of another embodiment of the invention;

FIGS. 6 and 7 are enlarged, fragmentary sectional views taken as indicated by the arrowed lines 6—6 and 7—7 of FIG. 5;

FIGS. 8 and 9 are fragmentary sectional views respectively taken along the arrowed lines 8—8 and 9—9 of FIG. 7;

FIG. 10 is a fragmentary sectional view taken along the arrowed line 10—10 of FIG. 6;

FIG. 11 is a fragmentary plan view of still another embodiment of the invention;

FIG. 12 is an enlarged, fragmentary sectional view taken as indicated by the arrowed line 12—12 of FIG. 11; and FIG. 13 is a fragmentary sectional view taken as indicated by the arrowed line 13—13 of FIG. 12.

*Soil tillage tool 20*

Referring initially to FIGS. 1 to 4 of the drawings, illustrated therein is a soil tillage tool 20 of the invention connected to and adapted to be drawn by a tractor 22. As will be described in more detail hereinafter, the tractor 22 includes a lifting apparatus 24 for moving the soil tillage tool 20 between a raised, inoperative position, not shown, clear of the ground surface 26 on which the tractor 22 runs, and a lowered, soil-tilling position, shown in FIG. 1, wherein the tool tills the soil below the ground surface on which the tractor runs.

In the particular construction illustrated, the tractor 22 is of the wheeled type, the frame of the tractor having mounted thereon driving and supporting means comprising driving rear wheels 30 and steerable front wheels 32, which may or may not be driving wheels also. It will be understood, however, that the invention is not limited to the particular style wheel-type tractor shown, nor is it limited to wheel-type tractors at all, being equally applicable to tractors of other types, e.g., a track-type tractor.

The lifting apparatus 24 of the tractor 22 is shown as a conventional three-point linkage 34 comprising two lower links 36 and an upper link 38 connected at their forward ends to the tractor. The soil tillage tool 20 includes a frame means comprising a forward mounting frame 40 to which the rearward ends of the links 36 and 38 are pivotally connected. The manner in which the three-point linkage 34 raises and lowers the soil tillage tool 20 is well known in the art so that a further description is not necessary. It will be understood that the invention is not limited to the particular three-point linkage 34 shown since the soil tillage tool 20 may be mounted on the tractor 22 by and raised and lowered by other lifting apparatus.

The soil tillage tool 20 is shown as comprising a forward coulter harrow 42 and a rearward moldboard plow 44. (The latter is shown as a one-way plow, but it will be understood that a two-way or reversible plow may be substituted in this and the other embodiments of the invention which are disclosed herein.) As will be discussed in more detail hereinafter, the coulter harrow 42 serves to stabilize the tractor 22 against any side draft produced by the moldboard plow 44, thereby preventing various undesirable effects of side draft transmission from the moldboard plow to the tractor. In other words, the coulter harrow 42 acts as a soil-tilling stabilizing means for preventing transmission to the tractor 22 of any side draft produced by the soil-tilling means represented by the moldboard plow 44.

Considering the stabilizing coulter harrow 42 in more detail, it comprises a stabilizing frame 46 extending transversely of and substantially perpendicular to the longitudinal centerline of the tractor 22. The stabilizing frame 46 constitutes a lower part of the mounting frame 40, being surmounted by an upper frame 48, shown as an A-frame, suitably secured to the stabilizing frame. More particularly, the stabilizing frame 46 is suitably connected to the bottom of the A-frame 48 and to a box structure 50 located rearwardly of the bottom of the A-frame and connected to the top of the A-frame by a brace 52. The rearward ends of the lower links 36 are pivotally connected to the front of the stabilizing frame 46, while the rearward end of the upper link 38 is pivotally connected to the top of the A-frame 48.

The stabilizing frame 46 carries coulter blades 54 spaced apart along a transverse axis substantially perpendicular to the longitudinal centerline of the tractor 22, and symmetrically arranged relative to such centerline. More particularly, the coulter blades 54 are carried by a transverse coulter shaft 56 mounted in suitable bearings on the stabilizing frame 46. Thus, the planes of the coulter blades 54 are substantially parallel to a vertical plane containing the longitudinal centerline of the tractor 22. Consequently, when the coulter blades 54 are in their soil-tilling positions, as shown in FIG. 1 of the drawings, they generate no side draft. At the same time, the coulter blades 54 transmit to the soil being tilled any side draft applied to the coulter harrow 42 by the moldboard plow 44, thereby preventing transmission of side draft generated by the moldboard plow to the tractor 22. This achieves the important results of improved plowing, reduced tractor wear and reduced driver fatigue hereinbefore discussed. In connection with the matter of tractor wear, it will be noted that the tractor 22 runs on an unplowed ground surface 26, thereby further reducing tractor wear since the wheels on one side of the tractor are not required to run in a previously-plowed furrow.

The moldboard plow 44 includes a tongue 58 the forward end of which, as best shown in FIG. 3 of the drawing, is connected to the bottom of the A-frame 48 by a universal joint 60 having intersecting vertical and transverse horizontal pivots 62 and 64, respectively. The box structure 50 rearwardly of the bottom of the A-frame 48 has the form of a transverse horizontal box through which the plow tongue 58 extends to permit the plow to swing horizontally so that it can seek a trailing position to minimize side draft. The internal vertical dimension of the box structure 50 is greater than the corresponding vertical dimension of the plow tongue 58 so that the plow 44 can also swing upwardly and downwardly to seek a trailing position to avoid imposing any vertical loads on the tractor 22 when crossing humps, depressions, or the like. Thus, the universal joint 60 permits the plow 44 to trail freely both horizontally and vertically, within the limits imposed by the internal, transverse horizontal and vertical dimensions of the box structure 50, so as to minimize side and vertical loads on the coulter harrow 42.

In the particular construction illustrated, the moldboard plow 44 is fully mounted, i.e., its weight is carried entirely by the tractor 22 when the soil tillage tool 20 is in its raised position clear of the ground. To prevent the plow 44 from swinging back and forth laterally in its raised position, the tongue 58 engages a notch 66 in the bottom wall of the box structure 50, as best shown in FIG. 4. It will be apparent that when the soil tillage tool 20 is in its raised position, the plow tongue 58 automatically enters the notch 66 in a short time if the plow 44 tends to swing back and forth laterally. Thus, this construction provides an automatic swing lock responsive to lifting of the plow 44 clear of the ground.

It will be understood that the weight of the soil tillage tool 20 and the suck of the plow 44 combine to hold the stabilizing coulter blades 54 in the ground.

As previously outlined, and as shown in FIG. 1 of the drawings, the transverse widths and locations of the stabilizing coulter harrow 42 and the moldboard plow 44 relative to the tractor 22 are such that the tractor runs on the level adjacent the previously-plowed furrow into which the front one of moldboard plow bottoms 68 plows. In other words, the right-hand wheels of the particular wheel-type tractor 22 shown are not required to run in a previously plowed furrow, the same being true of the wheels on both sides of the tractor in the event that a two-way plow is used. This is advantageous in minimizing soil compaction, tire wear, driver fatigue, and the like.

The moldboard plow bottoms 68 are mounted on a plow beam 70 connected to the tongue 58. As is conventional, the plow beam 70 is oriented at an angle other than 90° to the tongue 58.

Because of the fact that the tractor 22 runs on unplowed ground along a path spaced laterally from any previously-plowed furrow, it is normally necessary to utilize an array of plow bottoms 68 the longitudinal centerline of which is offset to one side of the longitudinal centerline of the tractor 22. The reason is that the tractor 22 in most instances does not have sufficient front-end weight and/or power to pull and/or lift an array of plow bottoms 68 which is laterally symmetrical relative to the longitudinal centerline of the tractor. With the plow bottoms 68 shown, it is normally necessary to offset the array of plow bottoms to the right of the longitudinal centerline of the tractor. In other words, it is necessary to have a number of plow bottoms 68 on the right side of the longitudinal centerline greater than the number of plow bottoms on the left side. In some instances, there may be no plow bottom on the left side of the longitudinal centerline of the tractor 22, or there may be only a fraction of a plow bottom, or a whole number of plow bottoms and a fraction of a plow bottom, on the left side. Considering four plow bottoms 68 as an example, all four may be located on the right side of the longitudinal centerline of the tractor 22, three may be located on the right side, or two and one-half may be located on the right side. It will be understood, of course, that in the event of plow bottoms plowing to the left, similar lateral offsets to the left are necessary.

The side draft inherently produced by the moldboard plow bottoms 68, coupled with the side draft produced by the offset of the array of plow bottoms to the right, even though minimized by the fact that the moldboard plow 44 is able to swing laterally into a trailing position, would tend to cause the tractor 22 to veer to the right, if same were transmitted to the tractor. The driver of the tractor 22 would have to correct this tendency of the tractor to veer to the right, and the end result would be a weaving or wandering of the tractor back and forth because of variations in side draft due to varying soil conditions, as well as due to oversteering and understeering. The end results would be an unsatisfactory plowing job, excessive wear on the tractor, and excessive driver fatigue.

The foregoing undesirable results are prevented by the stabilizing effect of the coulter blades 54. Instead of being transmitted to the tractor 22, any side draft generated by the moldboard plow 44 is transmitted to the coulter blades 54 and is, in turn, transmitted by them to the soil. Thus, the side draft generated by the moldboard plow 44 is not transmitted to the tractor 22, and the stabilizing coulter blades 54 provide a solid anchor for the tractor 22 serving to rigidify the combination of the tractor, its lifting aparatus 24 and the coulter harrow 42. Consequently, the tractor 22 follows a straight path with no significant tendency to veer therefrom. The ultimate results are a good plowing job, and minimum tractor wear and driver fatigue, all of which are important features.

It will be noted that the invention achieves the same results irrespective of whether the moldboard plow 44 is a one-way plow as shown, or a two-way or reversible plow, not shown, having two sets of plow bottoms one adapted to plow to the right-hand side and the other to the left-hand side. In either case, the tendency of the side draft generated by the plow is to cause the tractor to veer toward the previously plowed furrow, which tendency is substantially completely eliminated by the stabilizing coulter blades 54.

Since the side draft generated by the plow 44 is minimized because of its ability to swing laterally into a trailing position, the number of coulter blades required is relatively small. Five coulter blades 54 are shown, this number being sufficient for up to five of the plow bottoms 68, provided that the coulter blades have a diameter sufficient to enable them to penetrate to nearly the same depth as the plow bottoms. It will be noted that, with the construction shown, six plow bottoms 68 would produce an array symmetrical relative to the longitudinal centerline of the tractor 22. However, as hereinbefore explained, the tractor 22 normally will not have enough power for such a symmetrical array.

Soil tillage tool 120

Referring now to FIGS. 5 to 10 of the drawings, illustrated therein is a soil tillage tool 120 generally similar to the soil tillage tool 20 and mounted on the tractor 22 by the lifting aparatus 24 in the same manner. The same reference numerals are utilized for the various components of the tractor 22 and the lifting apparatus 24 as were utilized previously.

The soil tillage tool 120 includes a mounting frame 140 to which the rearward ends of the links 36 and 38 are pivotally connected. Secured to the mounting frame 140 are a coulter harrow 142 and a moldboard plow 144 respectively corresponding to the coulter harrow 42 and the moldboard plow 44. The mounting frame 140 includes a stabilizing coulter frame 146 surmounted by an A-frame 148. The latter is pivotally connected to the front side of the stabilizing frame 146 by a vertical pivot pin 150 located on the longitudinal centerline of the tractor 22. With this construction, the A-frame 148 is capable of pivoting relative to the stabilizing frame 146 about an upright pivot axis intersecting the longitudinal centerline of the tractor 22, there being sufficient play in the pivotal connection between the upper link 38 and the A-frame 148 to permit such pivoting of the A-frame.

Spaced rearwardly from the bottom of the A-frame 148 is a box structure 152 secured to the A-frame by two inwardly and rearwardly converging, horizontal braces 154 and a downwardly and rearwardly sloping brace 156. The box structure 152 carries a forwardly extending lug 158, FIGS. 7 and 8, which projects into a transverse slot 160 in the rearward portion of the stabilizing frame 146 to limit pivoting of the A-frame 148 about the upright axis of the pivot pin 150. The lug 158 is also engageable with the upper and lower edges of the slot 160 to stabilize the A-frame 148 as it pivots. Further stabilization is provided by ribs 162, FIG. 6, formed on the bottom of the A-frame 148 and engageable with the upper side of the stabilizing frame 146, and by a wear collar 161, FIG. 9, on a plow tongue 170 engageable with a support 163 on the frame 146.

With the foregoing construction, the A-frame 148 is pivotable relative to the stabilizing frame 146 about the upright axis provided by the pivot pin 150, within the limits imposed by the lug 158 in the slot 160.

The stabilizing coulter harrow 142 includes stabilizing coulter blades 164 carried by a transverse coulter shaft 166 mounted in suitable bearings 168 on the stabilizing frame 146. The coulter shaft 166 is substantially perpendicular to the longitudinal centerline of the tractor 22 so that the coulter blades 164 are spaced apart along a line substantially perpendicular to the longitudinal tractor centerline, the blades 164 being symmetrically arrayed relative to such centerline.

The tongue 170 of the moldboard plow 144 extends forwardly through the box structure 152, being snugly received therein, and through a complementary opening 172 in the bottom portion of the A-frame 148. A thrust collar 174 on the forward end of the plow tongue 170 transmits the drag of the plow 144 to the A-frame 148. As will be apparent, the moldboard plow 144 and the A-frame 148 may swing laterally in unison about the upright pivot axis provided by the pivot pin 150 to minimize the side draft applied to the stabilizing coulter harrow 142.

The moldboard plow 144 includes plow bottoms 176 mounted on a plow beam 178 connected to the tongue 170. The plow bottoms 176 are arranged in an array which is normally offset laterally to one side of the longitudinal centerline of the tractor 22, as hereinbefore discussed in connection with the array of plow bottoms 68. The lateral offset may be to either the right or the left, depending upon whether the plow bottoms plow to the right or the left.

It will be noted that the soil tillage tool 120 differs from the soil tillage tool 20 primarily in that the moldboard plow 144 and the A-frame 148 swing laterally in unison about the upright axis provided by the pivot pin 150, whereas, in the soil tillage tool 20, the A-frame 48 does not pivot and the moldboard plow 44 pivots relative thereto about the axis of the upright pivots 62. In all other respects, however, the operation of the soil tillage tool 120 is the same as that of the tool 20.

Soil tillage tool 220

Turning now to FIGS. 11 to 13 of the drawings, illustrated therein is a soil tillage tool 220 which, with exceptions to be described hereinafter, is identical to the soil tillage tool 120. Consequently, the same reference numerals are utilized.

The soil tillage tool 220 differs from the soil tillage tool 120 in that the A-frame 148 is rigidly connected to the stabilizing frame 146, as by bolting the A-frame to the stabilizing frame with bolts 180, FIGS. 12 and 13. Thus, the moldboard plow 144 is not free to swing laterally into a side-draft-minimizing position. The effect of this is to impose more side draft on the stabilizing coulter harrow 142. Such increased side draft is resisted by the coulter harrow 142, and is prevented thereby from being transmitted to the tractor 22, by increasing the number of coulter blades 164. With coulter blades of a diameter sufficient to cause them to penetrate to nearly the same depth as the plow bottoms 176, the number of coulter blades should be approximately double the number of plow bottoms, whereas, in the soil tillage tool 120, the number of coulter blades is approximately equal to the number of plow bottoms, as in the case of the soil tillage tool 20.

Except for the greater side draft which must be resisted by the coulter harrow 142 of the soil tillage tool 220, the operation of this tool is the same as the operation of the tool 20.

CONCLUSION

All of the embodiments hereinbefore disclosed permit lateral offsets of plow-bottom arrays to permit the tractor 22 to run on unplowed ground, where symmetrical arrays would exceed the power of the tractor, without transmitting the resulting side draft to the tractor. Consequently, the tractor 22 automatically follows a substantially straight path with no significant tendency to veer therefrom. The end result is a better plowing performance, less tractor wear, less driver fatigue, and the like. Furthermore, it has been found that with any of the soil tillage tools 20, 120 and 220, the stabilizing effect of the coulter blades results in a reduction in the amount of power required to pull the moldboard plow and the coulter harrow. Consequently, the tractor 22 may be operated at a lower power output for the same speed, or it may be operated at a higher speed with the same power output, which is an important feature. In addition to producing the foregoing effects, the coulter harrows of the soil tillage tools 20, 120 and 220 cut up trash, minimize clod size, and act as a depth gauge to prevent the moldboard plow from exceeding a predetermined depth.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. In a soil tillage tool movable between a lowered, soil-tilling position and a raised, inoperative position clear of the ground by a lifting apparatus of a tractor having a longitudinal centerline, the combination of:
    (a) a mounting frame;
    (b) means for connecting said mounting frame to the lifting apparatus of the tractor for movement thereby between raised and lowered positions;

(c) coulter blades carried by said mounting frame and spaced apart transversely of the longitudinal centerline of the tractor and positioned in soil-tilling engagement with the ground when said mounting frame is in its lowered position; and
(d) a moldboard plow located behind said mounting frame and pivotally connected to said mounting frame for lateral pivotal movement relative thereto about an upright axis and positioned in soil-tilling engagement with the ground when said mounting frame is in its lowered position.

2. In a soil tillage tool movable between a lowered, soil-tilling position and a raised, inoperative position clear of the ground by a lifting apparatus of a tractor having a longitudinal centerline, the combination of:
(a) a mounting frame;
(b) means for connecting said mounting frame to the lifting apparatus of the tractor for movement thereby between raised and lowered positions;
(c) coulter blades carried by said mounting frame and spaced apart transversely of the longitudinal centerline of the tractor and positioned in soil-tilling engagement with the ground when said mounting frame is in its lowered position;
(d) a moldboard plow located behind said mounting frame and pivotally connected to said mounting frame for lateral pivotal movement relative thereto about an upright axis and positioned in soil-tilling engagement with the ground when said mounting frame is in its lowered position; and
(e) said moldboard plow including a plurality of bottoms the majority of which are offset to one side of the longitudinal centerline of the tractor.

3. In a soil tillage tool movable between a lowered, soil-tilling position and a raised, inoperative position clear of the ground by a lifting apparatus of a tractor having a longitudinal centerline, the combination of:
(a) a mounting frame including a lower, stabilizing frame and including an upper frame surmounting said stabilizing frame and pivotally connected to said stabilizing frame for lateral pivotal movement relative thereto about an upright axis;
(b) means for connecting said mounting frame to the lifting apparatus of the tractor for movement thereby between raised and lowered positions;
(c) coulter blades carried by said stabilizing frame and spaced apart transversely of the longitudinal centerline of the tractor and positioned in soil-tilling engagement with the ground when said mounting frame is in its lowered position; and
(d) a moldboard plow positioned behind said coulter blades and connected to said upper frame and positioned in soil-tilling engagement with the ground when said mounting frame is in its lowered position.

4. In a soil tillage tool movable between a lowered, soil-tilling position and a raised, inoperative position clear of the ground by a lifting apparatus of a tractor having a longitudinal centerline, the combination of:
(a) a mounting frame including a lower, stabilizing frame and including an upper frame surmounting said stabilizing frame and pivotally connected to said stabilizing frame for lateral pivotal movement relative thereto about an upright axis;
(b) means for connecting said mounting frame to the lifting apparatus of the tractor for movement thereby between raised and lowered positions;
(c) coulter blades carried by said stabilizing frame and spaced apart transversely of the longitudinal centerline of the tractor and positioned in soil-tilling engagement with the ground when said mounting frame is in its lowered position;
(d) a moldboard plow positioned behind said coulter blades and connected to said upper frame and positioned in soil-tilling engagement with the ground when said mounting frame is in its lowered position; and
(e) said moldboard plow including a plurality of bottoms the majority of which are offset to one side of the longitudinal centerline of the tractor.

5. In a soil tillage tool movable between a lowered, soil-tilling position and a raised, inoperative position clear of the ground by a lifting apparatus of a tractor having a longitudinal centerline, the combination of:
(a) a mounting frame including a lower, stabilizing frame and including an upper frame surmounting said stabilizing frame and pivotally connected to said stabilizing frame for lateral pivotal movement relative thereto about an upright axis;
(b) means for connecting said mounting frame to the lifting apparatus of the tractor for movement thereby between raised and lowered positions;
(c) coulter blades carried by said stabilizing frame and spaced apart transversely of the longitudinal centerline of the tractor and positioned in soil-tilling engagement with the ground when said mounting frame is in its lowered position;
(d) a moldboard plow positioned behind said coulter blades and connected to said upper frame and positioned in soil-tilling engagement with the ground when said mounting frame is in its lowered position;
(e) the majority of the plow bottoms of said moldboard plow being offset to one side of the longitudinal centerline of the tractor; and
(f) said coulter blades and said plow bottoms being approximately equal in number.

References Cited by the Examiner

UNITED STATES PATENTS

| | | | |
|---|---|---|---|
| 333,601 | 1/1886 | Clarke | 172—166 |
| 466,772 | 1/1892 | Clark | 172—166 |
| 805,800 | 11/1905 | Jefferson | 177—180 X |
| 1,076,872 | 10/1913 | De Force | 177—178 X |
| 1,225,268 | 5/1917 | Paterson | 172—71 |
| 1,380,635 | 6/1921 | Clark | 172—178 |
| 2,698,567 | 1/1955 | Vlaich | 172—439 X |
| 2,724,313 | 11/1955 | Jennings | 172—439 X |

ABRAHAM G. STONE, *Primary Examiner.*

RAYMOND L. HOLLISTER, *Examiner.*